United States Patent
Hansen (10) Patent No.: US 10,986,847 B2
(45) Date of Patent: Apr. 27, 2021

(54) VIBRATION SEPARATOR SYSTEM FOR CONVEYING AND SEPARATING MEAT PIECES

(71) Applicant: CABINPLANT INTERNATIONAL A/S, Hårby (DK)

(72) Inventor: Henning Ingemann Hansen, Odense (DK)

(73) Assignee: CABINPLANT INTERNATIONAL A/S, Harby (DK)

(*) Notice: Subject to any disclaimer, the term of this patent is extended or adjusted under 35 U.S.C. 154(b) by 0 days.

(21) Appl. No.: 16/487,767

(22) PCT Filed: Feb. 19, 2018

(86) PCT No.: PCT/EP2018/054026
§ 371 (c)(1),
(2) Date: Aug. 21, 2019

(87) PCT Pub. No.: WO2018/153812
PCT Pub. Date: Aug. 30, 2018

(65) Prior Publication Data
US 2020/0229453 A1    Jul. 23, 2020

(30) Foreign Application Priority Data
Feb. 21, 2017 (EP) .................................. 17157213

(51) Int. Cl.
*B65G 27/04* (2006.01)
*B65G 27/16* (2006.01)
(Continued)

(52) U.S. Cl.
CPC .......... *A22C 17/0093* (2013.01); *B65G 27/04* (2013.01); *B65G 27/08* (2013.01);
(Continued)

(58) Field of Classification Search
None
See application file for complete search history.

(56) References Cited

U.S. PATENT DOCUMENTS 3,828,914 A  8/1974  Tull et al.
7,399,383 B2 *  7/2008  Giovinazzo ............ B65G 27/24
                                                  198/755
(Continued)

FOREIGN PATENT DOCUMENTS

EP        1840052          8/2010
JP     2018118836 A  *  8/2018  ........... G01G 19/387

OTHER PUBLICATIONS

International Search Report on corresponding PCT application (PCT/EP2018/054026) from International Searching Authority (EPO) dated Mar. 23, 2018.
(Continued)

*Primary Examiner* — Kavel Singh
(74) *Attorney, Agent, or Firm* — Klein, O'Neill & Singh, LLP (57) ABSTRACT

The present invention relates to a method and a vibration separator system for conveying and separating meat pieces and comprising a frame assembly having support columns, a supporting screen box being supported by the frame assembly on elastic suspension elements mounted between the frame assembly and the supporting screen box, a supply trough having an outlet and serving to receive the meat pieces, a vibration motor and a controller. The vibration motor is supported by and connected to the supporting screen box for reciprocating the supporting screen box. The controller is connected to the vibration motor for controlling the reciprocating movement of the supporting screen box. The supporting screen box comprises a first conveying sector for alignment of the meat pieces into a single row and a second conveying sector comprising a chicane for elongating the conveying path of travel as compared to the first conveying sector.

13 Claims, 5 Drawing Sheets

(51) Int. Cl.
*B65G 47/28* (2006.01)
*A22C 17/00* (2006.01)
*B65G 27/08* (2006.01)

(52) U.S. Cl.
CPC .............. *B65G 27/16* (2013.01); *B65G 47/28* (2013.01); *B65G 2201/0202* (2013.01)

(56) References Cited

U.S. PATENT DOCUMENTS

| | | | | |
|---|---|---|---|---|
| 7,754,984 B2* | 7/2010 | Sugioka | ................. | B65G 27/32 |
| | | | | 177/119 |
| 8,464,861 B2* | 6/2013 | Bonn | ..................... | B65G 27/20 |
| | | | | 198/758 |
| 9,038,815 B2 | 5/2015 | Kimura et al. | | |
| 2009/0260951 A1* | 10/2009 | Groenewald | .......... | B65G 27/04 |
| | | | | 198/411 |
| 2013/0146512 A1* | 6/2013 | Reynolds | ................. | B07C 5/10 |
| | | | | 209/539 |
| 2016/0244265 A1* | 8/2016 | Maggioni | ................ | B06B 1/06 |

OTHER PUBLICATIONS

Written Opinion on corresponding PCT application (PCT/EP2018/054026) from International Searching Authority (EPO) dated Mar. 23, 2018.

\* cited by examiner

VIBRATION SEPARATOR SYSTEM FOR CONVEYING AND SEPARATING MEAT PIECES

CROSS-REFERENCE TO RELATED APPLICATIONS

This application is the national phase entry, under 35 U.S.C. Section 371(c), of International Application No. PCT/EP2018/054026, filed Feb. 19, 2018, claiming priority from European Patent Application No. 17157213.4, filed Feb. 21, 2017. The disclosures of the International Application and the European Application from which this application claims priority are incorporated herein by reference in their entirety.

FEDERALLY SPONSORED RESEARCH OR DEVELOPMENT

Not Applicable

TECHNICAL FIELD

The present invention relates to a vibration separator system for conveying and separating meat pieces and comprising a frame assembly, a supporting screen box, a supply trough, a vibration motor and a controller.

BACKGROUND OF THE INVENTION

It has been known to use a vibration system for sorting and conveying articles, where the conveying includes a vibration mechanism making it possible to sort and convey a number of articles by using a vibration unit.

One example of a vibration system can be found in U.S. Pat. No. 9,038,815 B2, which discloses a conveying device being configured to generate vibrations in the horizontal and vertical directions and by altering the phase difference in one of the conveying directions it is possible to change the conveyance direction of the article being conveyed.

One of the disadvantages of the vibration system in U.S. Pat. No. 9,038,815 B2 is that the vibration system is related to a solution for sorting and conveying articles having different coefficients of friction. The vibration system has a conveyance surface, which is connected to a vibration mechanism and by setting the vibration to a predetermined phase difference it is possible for the article to be sorted in accordance with the coefficient of friction. The vibration system is not intended for sorting and conveying having the same coefficient of friction.

There is need for providing a vibration separator allowing an object having a sticky surface to be conveyed and separated forward with respect to the conveying direction. A further need is to provide a vibration separator allowing an object which is soft and absorbs vibration to be conveyed and separated forward with respect to the conveying direction.

An example of a vibration system for an object having a sticky surface can be found in EP1840052 B1, which discloses a vibration system comprising a trough on which an object to be transported is to be placed, a reciprocating mechanism for reciprocating the trough forward and backward with respect to a transportation direction of the object, and a control unit for controlling the reciprocating mechanism so as to move the trough forward at a higher velocity than backward.

The disadvantage of EP1840052 B1 is that the trough is reciprocated forward in a diagonally upward direction by means of the reciprocating mechanism having a parallel link mechanism comprising a plurality of vertical members for supporting the trough. By using a link mechanism for the vibration, further mechanical complexity is added to the vibration system. A further disadvantage is that the vibration system does not provide any solution for separating the meat pieces being delivered in bulk, nor does it provide a solution for separating the meat pieces from one another.

SUMMARY

The general object of the present invention is to provide a vibration separator system, that is capable of conveying and separating meat pieces being delivered in bulk, where the meat pieces are separated from one another for the meat pieces to be aligned into a single row.

In accordance with a first aspect of the present invention provides a vibration separator system for conveying and separating meat pieces and comprising a frame assembly, a supporting screen box, a supply trough, a vibration motor and a controller,
  the frame assembly having support columns,
  the supporting screen box being supported by the frame assembly on elastic suspension elements mounted between the frame assembly and the supporting screen box,
  the supply trough having an outlet and serving to receive the meat pieces,
  the vibration motor being supported by and connected to the supporting screen box for reciprocating the supporting screen box in respect to a conveying direction of the meat pieces,
  the controller being connected to the vibration motor and controlling the reciprocating movement of the supporting screen box,
  the supporting screen box having a first conveying sector being positioned juxtaposed and downstream relative to the supply trough for receiving the meat pieces from the outlet of the supply trough, and a second conveying sector comprising a chicane and being positioned juxtaposed and downstream relative to the first conveying sector for receiving the meat pieces from the first conveying sector,
  the first conveying sector providing alignment of the meat pieces into a single row, and
  the chicane providing an elongated conveying path of travel as compared to the first conveying sector for separating the meat pieces from one another.

The present invention is primarily directed towards a vibration separator system having a first conveying and a second conveying sector having a chicane for separating the meat pieces from one another.

Through the use of a vibration motor connected to the supporting screen box it is possible to separate the meat pieces being delivered in bulk to the supporting screen box by controlling the reciprocating movement of the supporting screen box.

An advantage according to a first aspect of the present invention is that meat pieces can be delivered in bulk to the supporting screen box, where the supporting screen box is able to align and separate the meat pieces. This is particularly advantageous as the first conveying sector provides alignment of the meat pieces into a single row or line and the second conveying sector having a chicane providing an elongated conveying path of travel as compared to the first conveying sector for separating the meat pieces from one another.

By having a supporting screen box comprising two conveying sectors (sections) it is possible to have each conveying sector dedicated for performing a specific function. The specific functions would be alignment into a single row in the first section of the conveying path and separating of the meat pieces (objects) from each other in the second section, as the meat pieces are being conveyed and/or transferred from the first section (first conveying sector) to the second section (second conveying sector). The two conveying sectors of the vibration separator system are able to deliver an output, where the meat pieces are separated from one another. The vibration separator system would facilitate that the meat pieces can be further processed or handled downstream as the meat pieces would be delivered individually so that each meat piece is separated by a certain distance from one another.

Even though the meat pieces have been aligned into a single row in the first conveying sector, it is still possible that two meat pieces are more or less aligned as the meat pieces approach the chicane of the second conveying sector. The chicane 26 is used for providing spacing between the meat pieces. The meat pieces having been conveyed to the chicane would encounter the first side of the chicane and would be guided along the first side of the chicane towards a second side of the chicane. The first and second sides are angled relative to the conveyance direction of the meat pieces.

As the meat pieces are conveyed towards the intersection between the first side and a second side of the chicane, each meat piece would be accelerated as the meat pieces pass the intersection between the first side of the chicane and a second side of the chicane.

The chicane would in a first preferred embodiment consist of a first side and a second side. The chicane would in a second embodiment have the geometrical shape of a rhombus with all four sides having the same length.

Through the use of a vibration motor like an unbalance motor, the unbalance motor can make the supporting screen box oscillate. An electrical controller is electrical connected to the vibration. Adjustment of the unbalance on the vibration motors can be performed during a standstill to change the oscillation amplitude.

It is furthermore possible to use an electrical controller with a frequency inverter connected to the vibration motor. Through the use of a frequency inverter it is possible to change the vibration frequency and obtain adjustment during operation of the vibration separator system as the frequency inverter is being used to change the vibration frequency.

Both vibration frequency and oscillation amplitude have influence on the vibration intensity and allow adaption to the different operation modes of the vibration separator system.

The vibration motor could be an enclosed three phase induction motor with an adjustable eccentric weight mounted at both ends of the shaft thereby allowing vibrations during rotation. Preferably, two horizontal vibration motors are installed in the lower part of the supporting screen box and vibration motors are able to produce an exciting force, hereby adaption to the different requirements is achievable by adjusting the motor eccentric block on each motor.

The supply trough is intended to be connected to the supporting screen box allowing the reciprocating movement of the supporting screen box to be transferred directly to the supply trough. However, it is also possible to connect the supply trough to the frame assembly to avoid the reciprocating movement of the supporting screen box to be transferred directly to the supply trough, hereby avoiding the vibration from the supporting screen box to be transferred to the supply trough. The supply trough could be mounted on vibration dampers.

It is within the scope of the present invention that more than one vibration source like vibration motors are mounted under the supporting screen box and that these vibration motors can be mounted in different positions. One further option could be to have a vibration source comprising a motor and the unbalancing element spaced apart from each other, whereby the unbalancing element is connected to the supporting screen box and the electrical motor is interconnected by a third element, which is not a linkage mechanism.

The term "meat pieces" should in this context be understood as cuts of meats coming from livestock animal raised in an agricultural environment for producing commodities such as food.

The meat would primarily come from a livestock like poultry or fish, where the meat would be delivered from a slaughterhouse, where the animals have been slaughtered for consumption as food for human, and the pieces of meat would therefore originate segments produced by cutting through the soft joint or carved out from large pieces.

The term "poultry" should in this context be understood as the types of poultry including chickens, ducks, geese, turkey, quail, pheasant.

The "breast" should in this context be understood as the portion without the fillet. The breast is the part of the poultry that would be divided further down after the fillets (tenderloins) have been removed and would hereafter be split and pounded into a thin cutlet referred to as a paillard. The white or light meat comes from the breast and wings, where the breast and wings are generally separated, and the chicken breast would in this context be without the drumette portion of the wing attached.

According to the first aspect of the invention, the vibration separator system further comprises a delivery section including an intermediate section, a first conveying tray and second conveying tray, the delivery section being positioned juxtaposed and downstream relative to the second conveying sector for receiving the meat pieces individually therefrom, the intermediate section being interposed between the first conveying tray and the second conveying tray, the first conveying tray being connected to the second conveying sector and for reciprocating together with the supporting screen box, the intermediate section being provided for decelerating or accelerating the meat pieces individually for providing an equidistant distance between the meat pieces.

Through the use of a delivery section including an intermediate section, a first conveying tray and second conveying tray, it is possible to ensure that the distance between neighboring meat pieces is the same. By delivering the meat pieces with equidistant distances between two neighboring meat pieces it is possible to handle a larger amount within the same timeframe. By delivering an output, where the meat pieces are delivered from the delivery section with equidistant distances between neighboring meat pieces, large scale production would be possible. The vibration separator system will be part of a production line, where the input to the vibration separator system and the output from the vibration separator system would need to be accommodated with respect to the production line.

According to the first aspect of the invention, the delivery section is being pivotably connected to the second conveying sector. By pivotably connecting the delivery section to the second conveying section, it is possible to change the output direction so that the vibration separator system in the production site does not occupy too much space on the production floor. Furthermore, it does not need to be placed in a straight line directly after the vibration separator system.

According to the first aspect of the invention, the first conveying sector or second conveying sector is being adjustable relative to the supporting screen box for allowing one or both of the sectors to change their inclination relative to the frame assembly. By adjusting the first conveying sector or second conveying sector relative to the supporting screen box, it is possible to change their inclination relative to the frame assembly and by changing the inclination of the second conveying sector relative to the first conveying sector, it is possible to accelerate the meat pieces in the conveyance direction in the second conveying sector even further.

According to the first aspect of the invention, the first conveying sector comprises two suspended conveying jigs being suspended and adjustable relative to the supporting screen box. Through the use of conveying jigs, it is possible to separate and singulate the meat pieces in the first conveying sector even further as changing the inclination of the conveying jigs relative to the frame assembly would increase the conveyance speed of the meat pieces in the conveyance.

According to the first aspect of the invention, the second conveying sector comprises two suspended conveying jigs being suspended relative to the supporting screen box. Through the use of conveying jigs, it is possible to separate and singulate the meat pieces in the first conveying sector even further as changing the inclination of the conveying jigs relative to the frame assembly would increase the conveyance speed of the meat pieces in the conveyance.

According to the first aspect of the invention, adjustment elements are being connected between the supporting screen box and the first conveying sector. Through the use of adjustment elements, it is possible to change the inclination of the first conveying sector relative to the supporting screen box. This is advantageous as changing the inclination relative to the frame assembly would result in accelerating the meat pieces in the conveyance direction.

According to the first aspect of the invention, adjustment elements are being connected between the supporting screen box and the second conveying sector. Through the use of adjustment elements, it is possible to change the inclination of the second conveying sector relative to the supporting screen box. This is advantageous as changing the inclination relative to the frame assembly would result in accelerating the meat pieces in the conveyance direction.

According to the first aspect of the invention, the first conveying sector comprises a number of side guides. Through the use of side guides, it is possible to adjust the width of the conveyance path in the first conveying sector.

According to the first aspect of the invention, the second conveying sector comprises a number of side guides. Through the use of side guides, it is possible to adjust the width of the conveyance path in the second conveying sector.

According to the first aspect of the invention, the support columns being adjustable individually for adjustment of the inclination of the supporting screen box relative to the ground level. Through the use of adjustable support columns, it is possible to allow the vibration separator system to be levelling.

In accordance with a method according to a second aspect of the invention, the invention discloses a method of conveying and separating meat pieces by means of a vibration separator system comprising a frame assembly, a supporting screen box, a supply trough, a vibration motor and a controller, the method comprising the following steps:

providing the frame assembly having support columns,
providing the supporting screen box being supported by the frame assembly on elastic suspension elements mounted between the frame assembly and the supporting screen box,
providing the supply trough having an outlet and serving to receive the meat pieces,
providing the vibration motor being supported by and connected to the supporting screen box,
providing the controller being connected to the vibration motor,
providing the supporting screen box having a first conveying sector being positioned juxtaposed and downstream relative to the supply trough, and a second conveying sector comprising a chicane and being positioned juxtaposed and downstream relative to the first conveying sector,
introducing the meat pieces into the supply trough and transferring the meat pieces from the outlet of the supply trough to the first conveying sector,
actuating the vibration motor for reciprocating the supporting screen box,
reciprocating the first sector for aligning the meat pieces into a single row movement, and
transferring the meat pieces from first conveying sector to the second conveying sector by the reciprocating movement controlled by the controller,
elongating the conveying path and separating the meat pieces from one another by conveying the meat pieces through the chicane in the second conveying sector by the reciprocating movement controlled by the controller, It should be noted that even though this application focus on describing and depicting a vibration separator system for conveying and separating poultry meat pieces like chicken breast pieces, the vibration separator is by no means limited to meat pieces originating from poultry. The vibration separator is system would also be capable to handle meat pieces originated from lamb, sheep, goats, swine, fish or cattle.

The vibration separator system is setup to handle meat pieces having a weight in the range of 25-2000 gram and ranging in the length of 25 mm-500 mm.

The vibration separator system is intended for handling meat pieces, which are in a non-frozen state, meaning that the temperature during conveying, sorting and separating the meat pieces would be above 0 degree Celsius and below 25 degree Celsius, preferably ranging between 1-10 degree Celsius.

BRIEF DESCRIPTION OF THE DRAWINGS

The invention will now be explained in more detail by means of examples of embodiment with reference to the schematic drawing.

DETAILED DESCRIPTION

Figure 1:
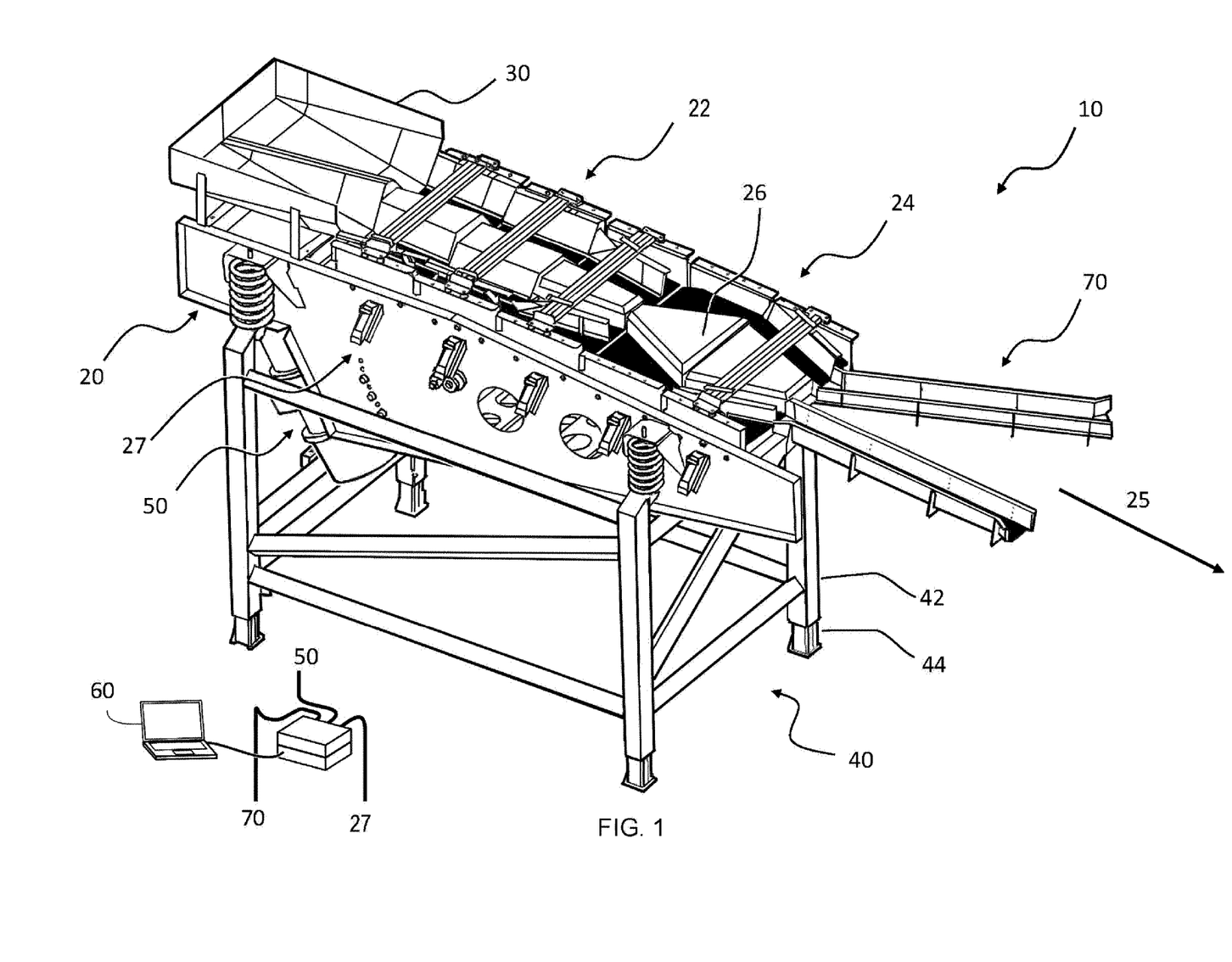
FIG. 1 is an overall schematic view of a presently preferred embodiment of the vibration separator system.

In FIG. 1, a first and presently preferred embodiment of a vibration separator system 10 for providing separating of meat pieces is shown. The vibration separator system comprises a supporting screen box 20, supply trough 30, a frame assembly 40, a vibration motor 50, a controller 60 and a delivery section 70.

The supporting screen box 20 would be made of a welded steel material, but could also be welded by various kinds of stainless steel according to requirement set. The supporting screen box 20 comprises supply trough 30 located in one end of the supporting screen box 20. The meat pieces will be delivered to the supply trough 30 for them to be conveyed in the conveyance direction 25 for the meat pieces to be aligned and separated from one another.

The supporting screen box 20 comprises a first conveying sector 22 being positioned juxtaposed and downstream relative to the supply trough 30 for receiving the meat pieces from the outlet of the supply trough. A second conveying sector 24 comprises a chicane 26 and positioned juxtaposed and downstream relative to the first conveying sector for receiving the meat pieces from the second first conveying sector 22.

The frame assembly 40 is preferably either aluminum, carbon steel or stainless steel according to requirement set by the food industry authority for the raw food material to be handled. The frame assembly 40 comprises four support columns 42, each being an individually adjustable leg 44 for adjustment of the inclination of the supporting screen box 20 relative to the ground level.

Figure 2:
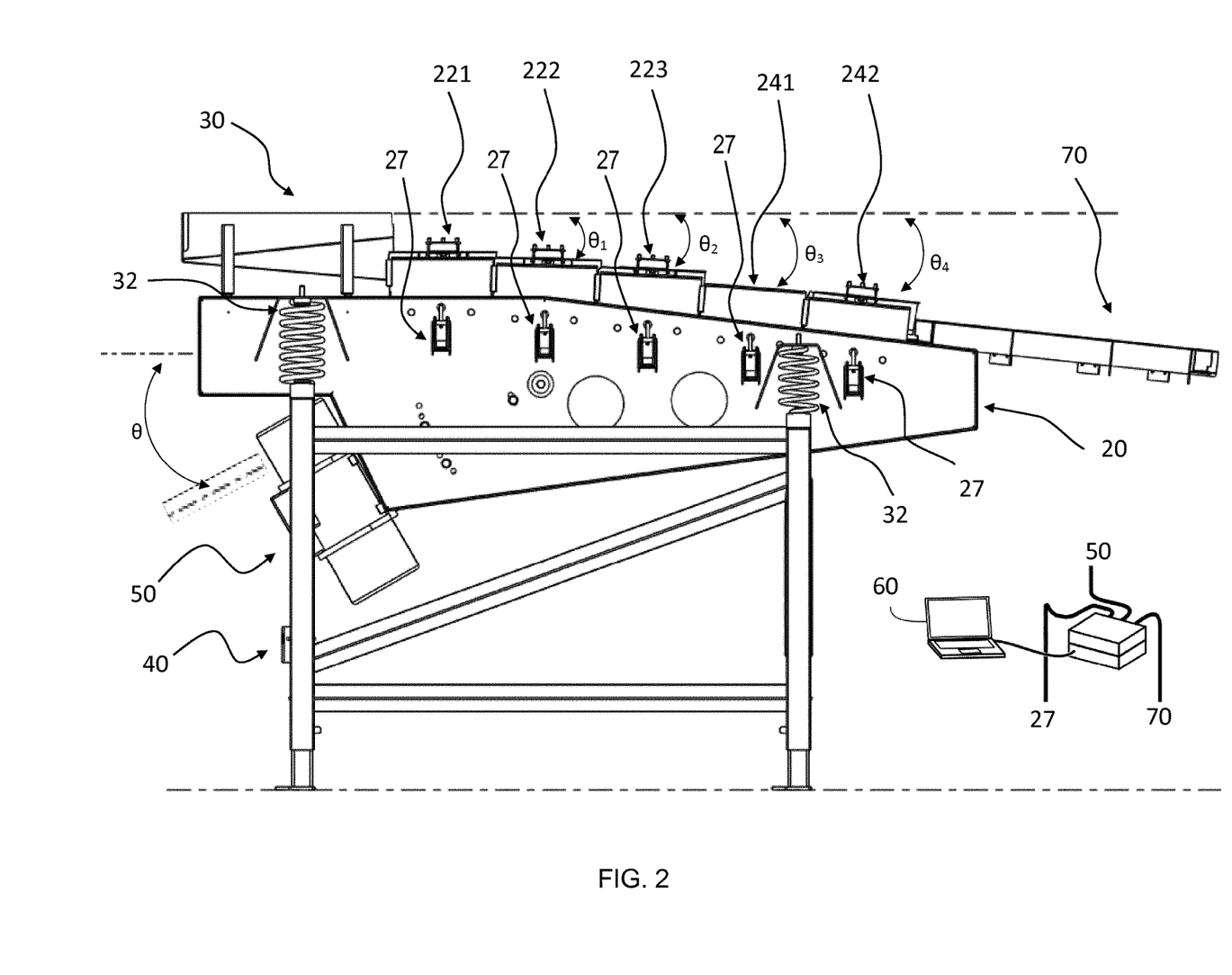
FIG. 2 is a view of a first and presently preferred embodiment of the vibration separator system.

FIG. 1 and FIG. 2 show a controller 60 connected to the adjustment elements 27, the vibration motor 50 and the delivery section 70. By connecting the adjustment elements 27 to the controller 60, it is possible to change the inclination of the conveying segments of the first conveying sector 22 and the second conveying sector 24. The controller 60 is furthermore connected to the vibration motor 50 for controlling the vibration generated by the vibration motor 50.

FIG. 2 shows a side view of the vibration separator system 10 comprising a vibration motor 50 mounted under the supporting screen box 20. The vibrator motor 50 is connected to the bottom of the supporting screen box and it is possible to change the inclination of the vibrator motor 50 relative to the supporting screen box 20.

Preferably, two horizontal vibration motors (only one shown in FIG. 1 and FIG. 2) are installed in the lower part of the supporting screen box 20 and the vibration motors 50 are able to produce an exciting force hereby, adaption to the different requirements is achievable by adjusting the motor eccentric block on each motor.

The two vibration motors 50 are installed on the vibration separator system 1 working simultaneously and with reverse rotation. The supporting screen box 20 is supported by the elastic suspension elements 32 in the shape of four springs to produce reciprocating linear motion under the vibration force generated by the vibration motors 50. Each vibration of the supporting screen box 20 causes the meat pieces to vibrate and as result of the vibration, the meat pieces are conveyed to the alignment section of the first section.

FIG. 2 shows the vibration separator system comprising a supporting screen box 20, supply trough 30, a frame assembly 40, a vibration motor 50, a controller 60 and a delivery section 70. The supporting screen box 20 being supported by the elastic suspension elements 32 and the first conveying sector comprising three suspended conveying segments 221, 222, 223, where the segments 221, 222, 223 are being suspended relative to the supporting screen box 20. By using the adjustment elements 27 controlled by the controller 60, it is possible to individually change the inclination of each of the conveying segments 221, 222, 223 of the first conveying sector 22. The inclination and thereby the inclination angle $\theta_1$-$\theta_4$, should be understood as the angle between the conveyance surface of the conveying segments relative to the supply trough (imaginary line depicted in FIG. 2).

The second conveying sector comprises two suspended conveying segments 241, 242 being suspended relative to the supporting screen box 20. By using the adjustment elements 27 controlled by the controller 60, it is possible to individually change the inclination of the conveying segments 241, 242 of the second conveying sector 22.

As can be seen in FIG. 1 and FIG. 2, the adjustment elements 27 in the first conveying sector 22 are connected in one end to the supporting screen box 20 and in the other end connected to one of the first conveying segment 221, 222, 223 of the first conveying sector 22. The adjustment elements 27 in the second conveying sector 24 are connected in one end to the supporting screen box 20 and in the other end connected to one of the second conveying segment 241, 242 of the second conveying sector 24. The first conveying segment 221, 222, 223 and second conveying segment 241, 242 all have a pivot point for allowing the conveying segment 221, 222, 223, 241, 242 to rotate relative to the supporting screen box 20. The pivot point for each of the conveying segment 221, 222, 223, 241, 242 facilitates that each conveying segment 221, 222, 223, 241, 242 can rotate around the pivot point, whereby the inclination angle $\theta_1$-$\theta_4$ can be increased.

Figure 4:
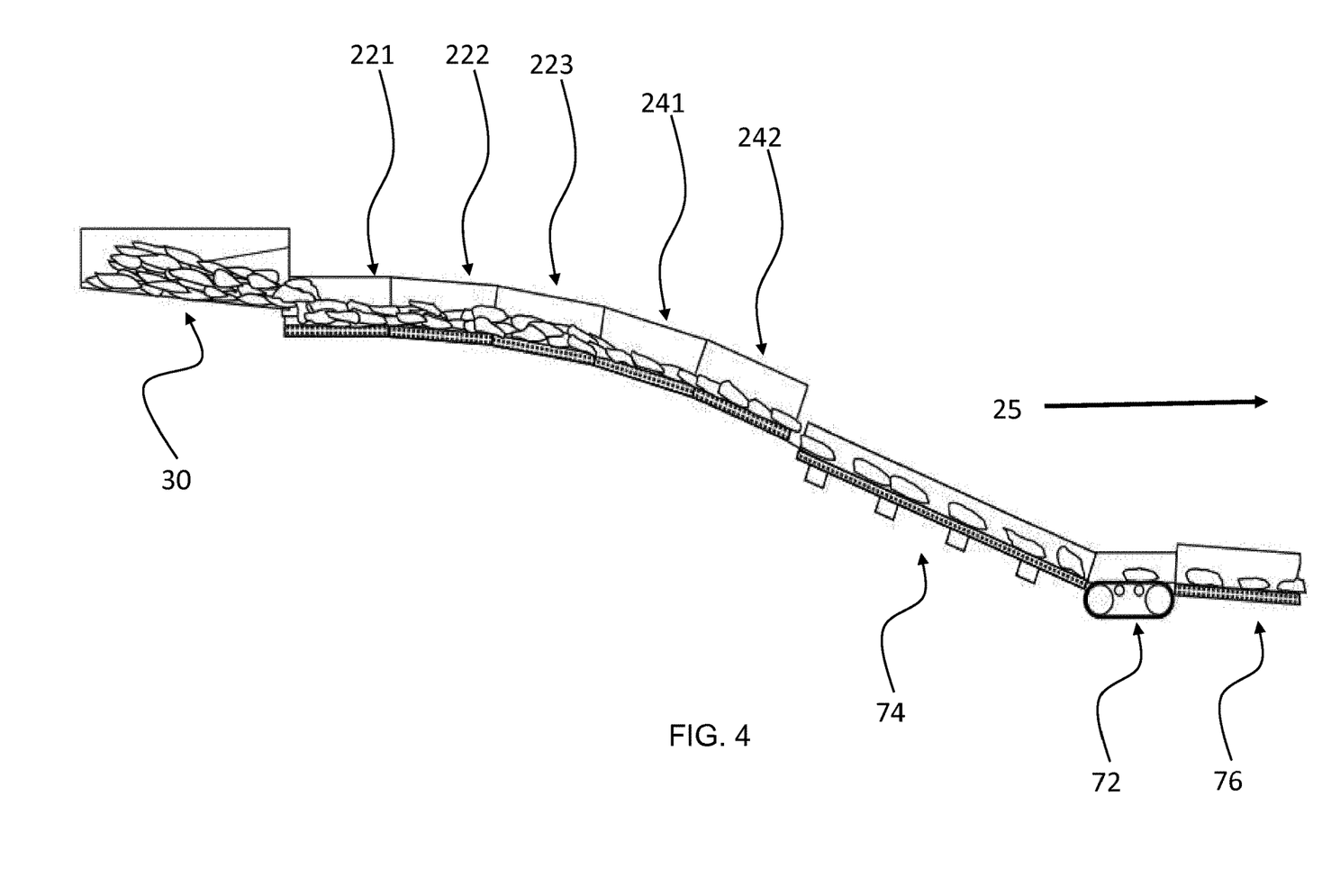
FIG. 4 shows a schematic drawing of the conveying and separating of the meat pieces in accordance with the presently preferred method.

As can be seen in FIG. 2 and FIG. 4, the inclination angle $\theta_1$-$\theta_4$ is increased between to neighboring conveying segments 221, 222, 223, 241, 242 in the conveyance direction 25. By increasing the inclination angle $\theta_1$-$\theta_4$, the meat pieces would be accelerated as the meat pieces are transported from one conveying segment to the neighboring conveying segment in conveyance direction 25. The first conveying sector and the second conveying sector are adjustably relating to the supporting screen box 20 for allowing one or both of the sectors to change their inclination relative to the frame assembly 20 indicated by the dotted line in FIG. 2.

The adjustment elements 27 are arranged on both sides of the supporting screen box 20 and each adjustment element 27 is connected to a conveying segment at a point that is distant from the pivot point of the conveying segment.

Figure 3:
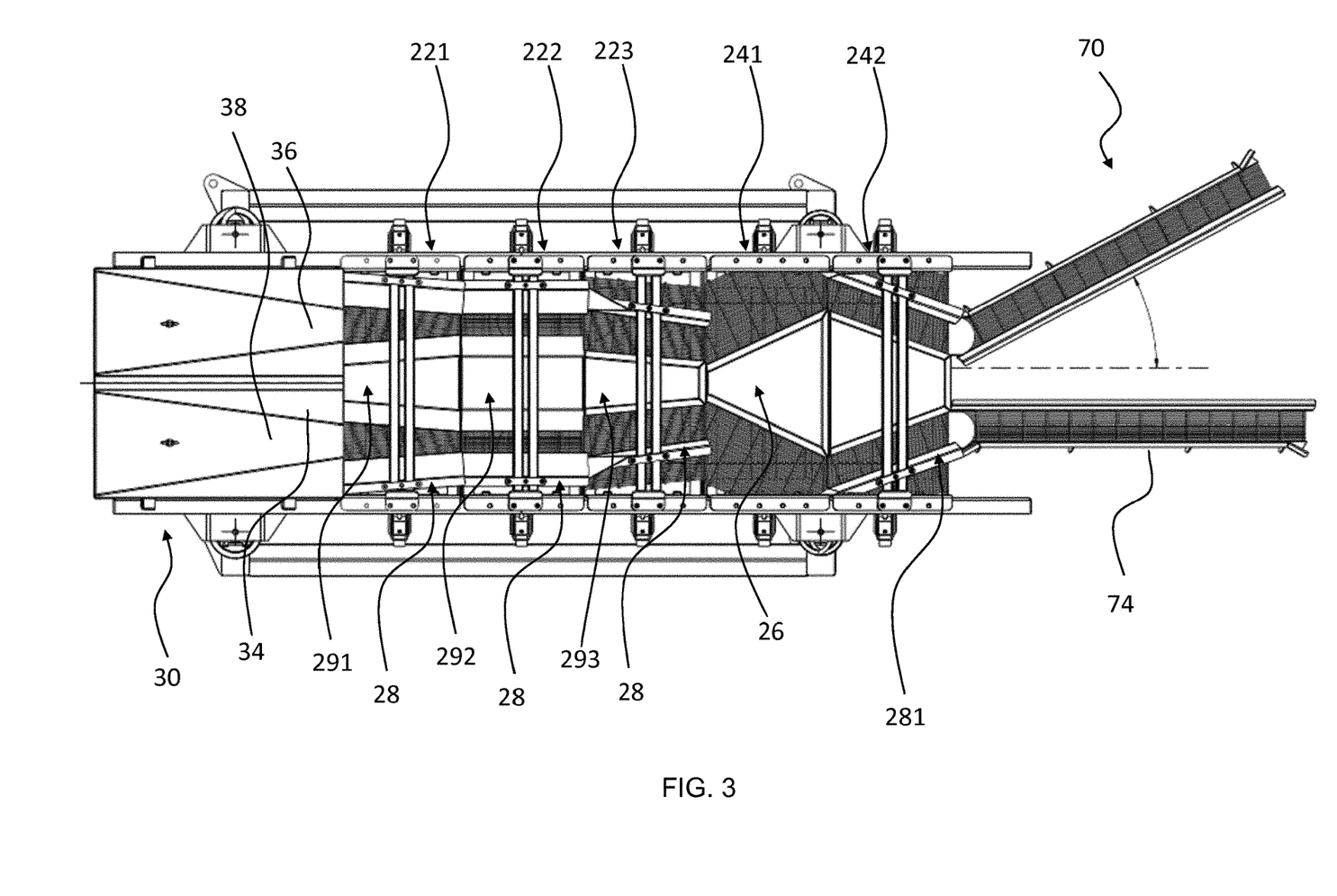
FIG. 3 is a top up view of the vibration separator system.

FIG. 3 shows a top view of the vibration separator system 10, where the supply trough 30 has an outlet and being connected to one end of the supporting screen box 20. The outlet of the supply trough 30 having a funnel shape with an inner upward curved surface 34 being provided in the supply trough 30 in the longitudinal direction parallel with the conveyance direction 25. The supply trough 30 serves to receive the meat pieces to be conveyed into a double funnel track 36 38.

The supporting screen box 20 has a first conveying sector comprising three suspended conveying segments 221, 222, 223, where three midsections 291 292 293 are arranged between side guides 28 connected to the first conveying segment 221, 222, 223 relative to the supporting screen box 20. The side guides 28 provide guidance of the meat pieces towards the chicane 26 arranged on the conveying surface of the second conveying sector.

The second conveying segment 241, 242 of the second conveying sector 24 is able to provide separation of the meat pieces, as the meat pieces are being conveyed from the first conveying segment 223 of the first conveying sector. The second conveying segment 242 has two side guides 281 for guiding the meat pieces towards the first conveying tray 74 of the delivery section 70. The delivery section 70 being pivotably connected to the second conveying segment 242 of the second conveying sector 24.

As shown in FIG. 1 and FIG. 3, the second conveying sector comprises a chicane 26 arranged on the conveying surface of the second conveying sector for separating the meat pieces being conveyed from the first section.

Figure 5:
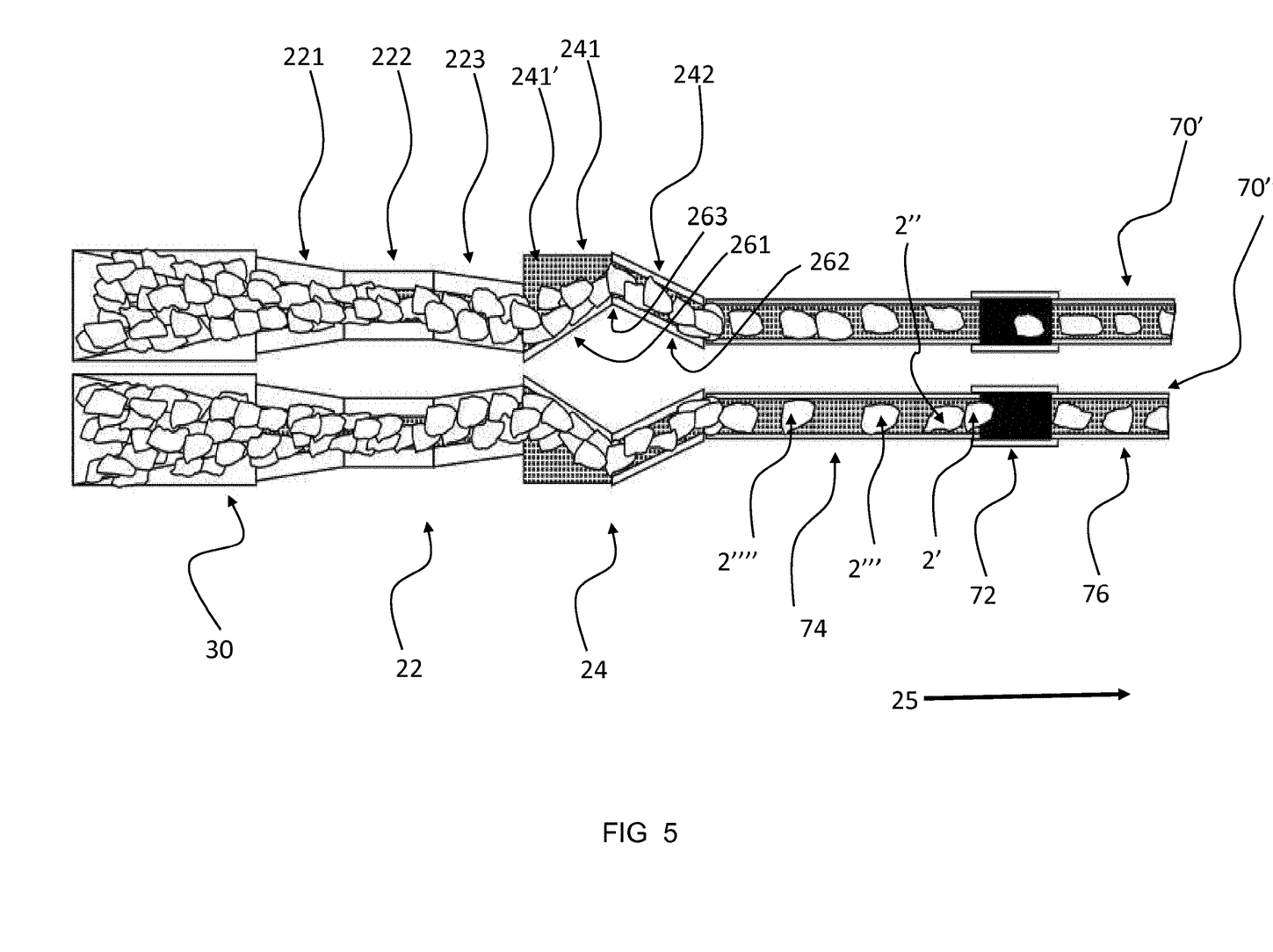
FIG. 5 shows a schematic drawing of conveying and separating of the meat pieces in accordance with the presently preferred method.

FIG. 5 and FIG. 4 show the process of vibrating the meat pieces 2, where the meat pieces 2 will both be aligned into one row before the meat pieces 2 encounter the chicane 26 in the second conveying sector.

Even though the meat pieces 2 have been aligned into a single row in the first conveying sector 22, it is still possible that two meat pieces are more or less aligned as the meat pieces approach the chicane 26 of the second conveying sector 24. The chicane 26 is used for providing spacing between the meat pieces 2. The meat pieces having been conveyed to the chicane would encounter the first side 261 of the chicane and would be guided alone the first side 261 of the chicane towards the second side 262 of the chicane. The first and second sides 261 262 are angled relative to the conveyance direction 25 of the meat pieces.

As the meat pieces are conveyed towards the intersection 263 between the first side 261 and a second side 262 of the chicane, each meat piece would be accelerated as the meat pieces pass the intersection 263 between the first side 261 of the chicane and a second side 262 of the chicane.

The chicane 26 would in a first preferred embodiment consist of a first side 261 and a second side 262. The chicane would in a second embodiment have the geometrical shape of a rhombus with all four sides having the same length as shown in FIG. 3.

Transferring of the meat pieces from the supply trough to the first conveying sector 22 is achieved by the reciprocating movement of the supporting screen box being controlled by the controller.

As can be seen in FIG. 5, the reciprocating the first conveying sector 22 provides alignment of the meat pieces into two rows.

By adjusting the first conveying sector and the second conveying sector relative to the supporting screen box for allowing each conveying segment 221, 222, 223, 241, 242 to be angled relative to the horizontal plane defined by the convey direction 25, it is possible to separate the meat pieces from one another as the meat pieces are conveyed past the chicane 26 in the second conveying sector 24. The conveying segment 241 has a capacity zone, that can be used for stalling meat pieces being conveyed from the first conveying segment 241 before being conveyed further downstream.

The first conveying sector 22 provides alignment of the meat pieces into a single row, and the chicane 26 provides an elongated conveying path of travel as compared to the first conveying sector 22 for separating the meat pieces from one another.

The vibration separator system shown in FIG. 4 and FIG. 5 has a delivery section 70 according to a third preferred embodiment of the present invention where the delivery section further comprises an intermediate section 72, a first conveying tray 74 and second conveying tray 76.

The delivery section 70 is positioned juxtaposed and downstream relative to the second conveying sector 24 for receiving the meat pieces individually therefrom. An intermediate section is interposed between the first conveying tray 74 and the second conveying tray 76 and the first conveying tray 74 is connected to the second conveying sector 24 and for reciprocating together with the supporting screen box 20. The delivery section 70 is able to swing from one side to another, thereby delivering the meat pieces further downstream like an infeed unit so that the meat pieces are spread over a conveying surface.

The intermediate section 72 is provided for decelerating or accelerating the meat pieces being delivered from the first conveying tray 74 and by using the intermediate section it is possible to provide an equidistant distance between the meat pieces to the second conveying tray 76.

The controller would be connected to the intermediate section 72 enabling the controller to control the motion of the conveying belt of the intermediate section 72. The controller would likewise be coupled to sensing means provided upsteam on either the first conveying tray 74 and/or the second conveying sector 24. The sensing means would be selected from a group of sensors covering photoelectric sensors, ultrasonic sensor optical sensor, acoustic sensor or similar sensor suitable for detecting and measuring the distance between meat pieces being convey on the first conveying tray 74.

FIG. 5 shows two different situations 70' 70", where the first situation is shown on the conveying track in the top of the drawing, whereas the second situation 70" is indicated on the conveying tack shown below the upper conveying track 70'.

In the first situation 70', the meat pieces on the conveyor belt of the intermediate section 72 are conveyed with the same speed as the three meat pieces already conveyed onto the second conveying tray 76. As the distance between the neighboring meat pieces on the second conveying tray 76 is correct (same distance), the conveyor belt would not be decelerated or accelerated.

In the second situation, the two meat pieces positioned on the first conveying tray 74 are not separated from one another, the meat piece approaching the conveyor belt of the intermediate section 72 needs to be accelerated using the intermediate section 72 for providing an equidistant distance between the meat pieces on the second conveying tray 76.

It would also be evident from looking at FIG. 5, that a third situation is also about to occur. The meat pieces 2''' and 2'''' on the first conveying tray 74 have been spaced apart with a larger distance than the intended distance set by the operator of vibration separator system 10. The controller would in this situation receive an input from one of the sensors positioned upstream relative to the intermediate section 72, the input from the sensor would cause the conveyor belt of the intermediate section 72 to be decelerated, thereby closing the distance between the meat pieces 2''' and 2''''. The intermediate section 72 will provide for decelerating the meat pieces 2''' and 2'''' being delivered from the first conveying tray 74 and by using the intermediate section 72 to provide an equidistant distance between the meat pieces 2''' and 2'''' to the second conveying tray 76.

The conveyor belt has the same length as one meat piece. The delivery section is connected to the supporting screen box so that vibration is transferred to the first conveying tray 74. The intermediate section supported by a frame (not shown) is not connected to the first conveying tray 74 or to the second conveying tray 76.

REFERENCE NUMBERS meat pieces 2' 2" 2''' 2''''
vibration separator system 10
supporting screen box 20
first conveying sector 22
first conveying segment 221, 222, 223
second conveying sector 24
second conveying segment 241, 242
conveyance direction 25
chicane 26
chicane first side 261
chicane second side 262
intersection 263
first side of the chicane 261*a*
second side of the chicane 262*a*
first side of the chicane 261*b*
second side of the chicane 262*b*
adjustment elements 27
side guide 28 281
midsection 291 292 293
supply trough 30
elastic suspension elements 32
upward curved surface 34
funnel track 36 38
frame assembly 40
support columns 42
adjustable leg 44
vibration motor 50
control unit 60
delivery section 70
intermediate section 72
first conveying tray 74
second conveying tray 76
delivery section—first situation 70'
delivery section—first situation 70"

The invention claimed is:

1. A vibration separator system for conveying and separating meat pieces, comprising:
   a frame assembly having support columns;
   a supporting screen box supported by the frame assembly on elastic suspension elements mounted between the frame assembly and the supporting screen box;
   a supply trough having an outlet and configured to receive meat pieces;
   a vibration motor supported by and connected to the supporting screen box so as to reciprocate the supporting screen box with respect to a conveying direction of the meat pieces; and
   a controller operatively connected to the vibration motor so as control the reciprocating movement of the supporting screen box by the vibration motor;
   wherein the supporting screen box includes (i) a first conveying sector positioned juxtaposed and downstream relative to the supply trough so as to receive the meat pieces from the outlet of the supply trough, and (ii) a second conveying sector comprising a chicane and positioned juxtaposed and downstream relative to the first conveying sector so as to receive the meat pieces from the first conveying sector;
   wherein the first conveying sector is configured to align the meat pieces into a single row; and
   wherein the chicane is configured to provide an elongated conveying path of travel as compared to the first conveying sector so as to separate the meat pieces from one another.

2. The vibration separator system according to claim 1, further comprising a delivery section including an intermediate section, a first conveying tray, and second conveying tray;
   wherein the delivery section is positioned juxtaposed and downstream relative to the second conveying sector so as to receive the meat pieces individually therefrom,
   wherein the intermediate section is interposed between the first conveying tray and the second conveying tray;
   wherein the first conveying tray is connected to the second conveying sector so as to be reciprocated together with the supporting screen box; and
   wherein the intermediate section is configured and operable for decelerating or accelerating the meat pieces individually so as to provide an equidistant distance between individual meat pieces.

3. The vibration separator system according to claim 2, wherein the delivery section is pivotably connected to the second conveying sector.

4. The vibration separator system according to claim 1, wherein one of the first conveying sector and the second conveying sector is adjustable relative to the supporting screen box so as to allow at least one of the first and second conveying sectors to change in inclination relative to the frame assembly.

5. The vibration separator system according to claim 1, further comprising adjustment elements connected between the supporting screen box and the first conveying sector.

6. The vibration separator system according to claim 1, further comprising adjustment elements connected between the supporting screen box and the second conveying sector.

7. The vibration separator system according to claim 1, wherein the first conveying sector comprises a plurality of side guides.

8. The vibration separator system according to claim 1, wherein the second conveying sector comprises a plurality of side guides.

9. The vibration separator system according to claim 1, wherein the elastic suspension elements include spring elements.

10. The vibration separator system according to claim 1, wherein the support columns are adjustable individually for adjustment of an inclination of the supporting screen box relative to the ground level.

11. A method of conveying and separating meat pieces by means of a vibration separator system comprising a frame assembly having a plurality of support columns, a supporting screen box supported by the frame assembly on elastic suspension elements mounted between the frame assembly and the supporting screen box, and a supply trough configured to receive meat pieces and having an outlet, wherein the supporting screen box includes (i) a first conveying sector positioned juxtaposed and downstream relative to said supply trough, and (ii) a second conveying sector comprising a chicane and positioned juxtaposed and downstream relative to the first conveying sector, the method comprising the following steps:
   (a) introducing meat pieces into the supply trough and transferring the meat pieces from the outlet of the supply trough to the first conveying sector;

(b) imparting a reciprocating movement to the supporting screen box, including the first and second conveying sectors, so as to align the meat pieces into a single row alignment; and (c) transferring the meat pieces from the first conveying sector to the second conveying sector by the reciprocating movement; and (d) separating the meat pieces from one another by conveying the meat pieces through the chicane in the second conveying sector by the reciprocating movement.

12. The method of conveying and separating meat pieces according to claim 11, wherein vibration separator system further comprises a delivery section including an intermediate section, a first conveying tray and second conveying tray, and wherein the delivery section is positioned downstream and juxtaposed to the second conveying sector, the method further comprising imparting the reciprocating movement to the intermediate section so as to selectively decelerate or accelerate the delivery of the meat pieces from the first conveying tray.

13. The method according to claim 11, wherein the reciprocating movement is imparted by a vibration motor under the control of a controller.

* * * * *